(12) United States Patent
Owejan et al.

(10) Patent No.: US 8,501,364 B2
(45) Date of Patent: Aug. 6, 2013

(54) FUEL CELL BIPOLAR PLATE EXIT FOR IMPROVED FLOW DISTRIBUTION AND FREEZE COMPATIBILITY

(71) Applicant: GM Global Technology Operations LLC, Detroit, MI (US)

(72) Inventors: Jon P. Owejan, Honeoye, NY (US); Thomas W. Tighe, Bloomfield, NY (US); Jeffrey A. Rock, Fairport, NY (US); Thomas A. Trabold, Pittsford, NY (US); Steven R. Falta, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/735,144

(22) Filed: Jan. 7, 2013

(65) Prior Publication Data

US 2013/0122389 A1    May 16, 2013

Related U.S. Application Data

(62) Division of application No. 11/851,401, filed on Sep. 7, 2007, now Pat. No. 8,394,547.

(51) Int. Cl.
*H01M 2/40* (2006.01)

(52) U.S. Cl.
USPC ........... 429/457; 429/414; 429/456; 429/458; 429/514; 429/518

(58) Field of Classification Search
USPC .......................... 429/414, 456–458, 514, 518
See application file for complete search history.

(56) References Cited

U.S. PATENT DOCUMENTS

| | | | |
|---|---|---|---|
| 6,261,710 B1* | 7/2001 | Marianowski | 429/434 |
| 2002/0127461 A1 | 9/2002 | Sugita et al. | |
| 2003/0124405 A1 | 7/2003 | Rock | |
| 2006/0003220 A1* | 1/2006 | Sugiura et al. | 429/38 |
| 2006/0292431 A1* | 12/2006 | Sohn et al. | 429/38 |
| 2007/0160894 A1* | 7/2007 | Park et al. | 429/39 |
| 2007/0178359 A1* | 8/2007 | Peng et al. | 429/38 |

FOREIGN PATENT DOCUMENTS

| | | |
|---|---|---|
| DE | 102007008214 A1 | 8/2007 |
| DE | 102007055220 A1 | 6/2008 |
| DE | 102008016093 A1 | 11/2008 |

* cited by examiner

*Primary Examiner* — Ula C Ruddock
*Assistant Examiner* — Amanda Barrow
(74) *Attorney, Agent, or Firm* — Fraser Clemens Martin & Miller LLC; J. Douglas Miller

(57) ABSTRACT

A fuel cell assembly is disclosed that utilizes a water transport structure extending from fuel cell plates of the assembly into fuel cell assembly manifolds, wherein the water transport structure facilitates the transport of liquid water from the fuel cell plates thereby minimizing the accumulation of liquid water and ice in the fuel cell stack.

14 Claims, 2 Drawing Sheets

_US 8,501,364 B2_

FUEL CELL BIPOLAR PLATE EXIT FOR IMPROVED FLOW DISTRIBUTION AND FREEZE COMPATIBILITY

CROSS-REFERENCE TO RELATED APPLICATION

This application is a divisional application of U.S. patent application Ser. No. 11/851,401 filed Sep. 7, 2007, hereby incorporated herein by reference in its entirety.

FIELD OF THE INVENTION

The invention relates to a fuel cell assembly, and more particularly to a fuel cell assembly utilizing water transport structures partially disposed in a manifold of the fuel cell stack to facilitate the transport of liquid water from the fuel cell assembly.

BACKGROUND OF THE INVENTION

Fuel cell power systems convert a fuel and an oxidant to electricity. One type of fuel cell power system employs a proton exchange membrane (hereinafter "PEM") to catalytically facilitate reaction of fuels (such as hydrogen) and oxidants (such as air or oxygen) to generate electricity. The PEM is a solid polymer electrolyte that facilitates transfer of protons from the anode to the cathode in each individual fuel cell of a stack of fuel cells normally deployed in a fuel cell power system.

In a typical fuel cell stack of a fuel cell power system, individual fuel cells provide channels through which various reactants and cooling fluids flow. Fuel cell plates may be unipolar, or a bipolar plate may be formed by combining a plurality of unipolar plates. Fuel cell plates may be designed with serpentine flow channels. Serpentine flow channels are desirable as they effectively distribute reactants over the active area of an operating fuel cell, thereby maximizing performance and stability. Movement of water from the flow channels to outlet manifolds of the fuel cell plates is caused by the flow of the reactants through the fuel cell. Drag forces cause the liquid water to flow through the channels until the liquid water exits the fuel cell through the outlet manifolds. However, when the fuel cell is operating at a lower power output, the velocity of the gas flow is too low to produce an effective drag force to transport the liquid water, and the liquid water accumulates in the flow channels.

A further limitation of relying on gas flow drag forces to remove the liquid water is that the drag forces may not be strong enough to effectively transport the liquid water creating pinning points that may cause the water to accumulate and pool, thereby stopping the water flow. Such pinning points are those commonly located where the channel outlets meet the fuel cell stack manifold.

Some current fuel cell assemblies utilize plates having hydrophilic surfaces. Water has been observed to form a film on the surface of the material and accumulate at the outlet of the flow channels and the perimeter of the plates. The water film can block the gas flow, which in turn reduces the driving force for removing liquid water and prevents the removal of the liquid water from the fuel cell stack. The accumulation of water can cause gas flow blockages or flow imbalances that can have negative impacts on the performance of the stack.

Further, the accumulated water may form ice in the fuel cell assembly. The presence of water and ice may affect the performance of the fuel cell assembly. During typical operation of the fuel cell assembly, waste heat from the fuel cell reaction heats the assembly and militates against vapor condensation and ice formation in the assembly. During a starting operation or low power operation of the fuel cell assembly in subzero temperatures, the condensed water in the flow channels of the fuel cell plates and at edges of the outlet manifolds may form ice within the fuel cell assembly. The ice formation may restrict reactant flow, resulting in a voltage loss.

It would be desirable to develop a fuel cell assembly with an improved means for removing liquid water from fuel cell gas flow channels of the fuel cell stack to minimize the accumulation of liquid water and ice in the fuel cell assembly.

SUMMARY OF THE INVENTION

Concordant and congruous with the present invention, a fuel cell assembly with an improved means for removing liquid water from fuel cell gas flow channels of the fuel cell assembly to minimize the accumulation of liquid water and ice in the fuel cell assembly, has surprisingly been discovered.

In one embodiment, the fuel cell plate comprises a plate having a first aperture formed therein; a plurality of flow channels formed on said plate; and a water transport structure disposed between at least one of said flow channels and the aperture of said plate to facilitate a transport of water from the at least one of said flow channels to the aperture.

In another embodiment, the fuel cell plate comprises a bipolar plate; a plurality of flow channels formed on each face of said bipolar plate; at least one aperture formed through said bipolar plate; and a water transport structure, wherein said water transport structure includes a first end disposed through an aperture formed in a face of said bipolar plate between the flow channels and the aperture, an intermediate portion disposed between the faces of said bipolar plate, and a second end extending from the intermediate portion into the aperture.

In another embodiment, the fuel cell assembly comprises a fuel cell stack including a plurality of fuel cell plates, each fuel cell plate having a plurality of flow channels and a plurality of faces, wherein each fuel cell plate includes at least one aperture formed therein, the apertures of the fuel cell plates substantially aligned to form a manifold; and a water transport structure extending into the manifold from an inner edge of the aperture of each fuel cell plate, wherein water is caused to flow from the fuel cell plate, through said water transport structure, and through the manifold.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
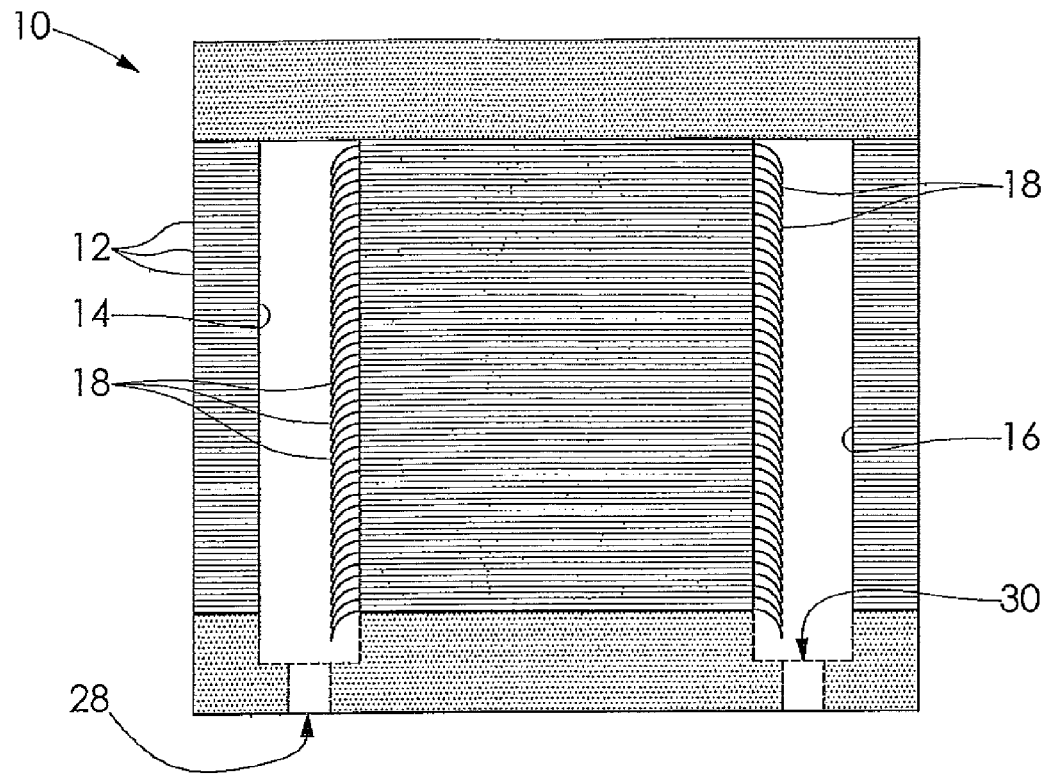
FIG. 1 is a cross-sectional view of a fuel cell stack incorporating a water transport structure in a fuel cell stack manifold according to an embodiment of the invention.
Figure 2:
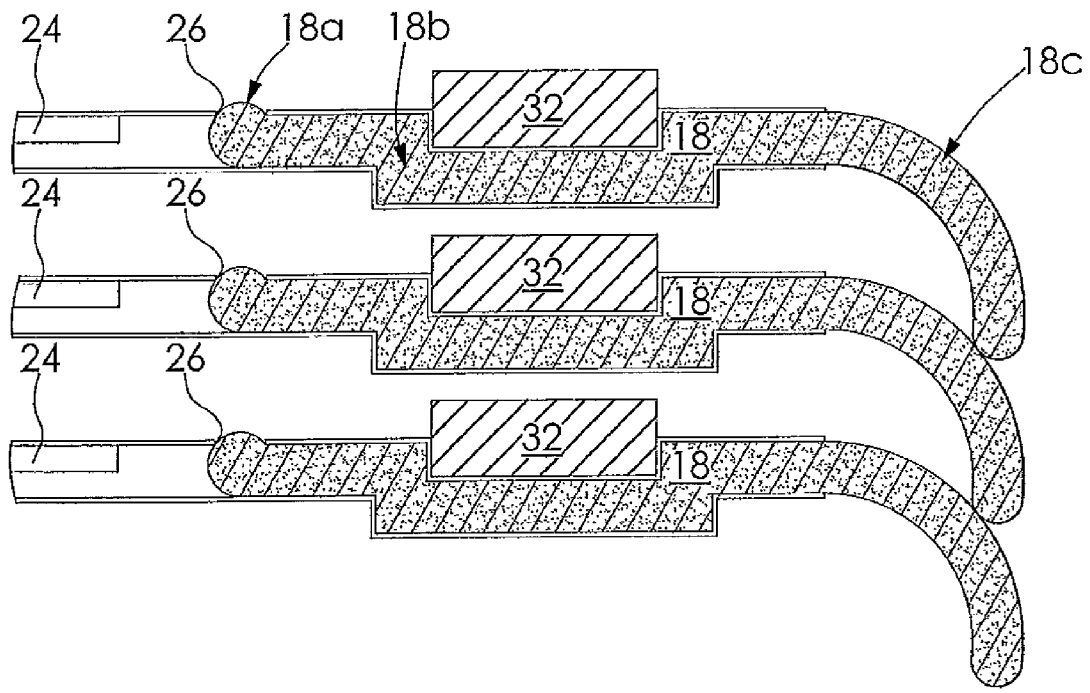
FIG. 2 is a schematic cross-sectional view of the water transport structure of the fuel cell stack illustrated in FIG. 1.

FIGS. 1 and 2 show a fuel cell assembly 10 according to an embodiment of the invention. The fuel cell assembly includes a plurality of stacked fuel cell plates 12. Each of the plates 12 includes an inlet aperture, an outlet aperture, and a plurality of water transport structures 18. The inlet apertures of each of the plates 12 cooperate to form an inlet manifold 14 and the outlet apertures of each of the plates 12 cooperate to form an outlet manifold 16. The inlet manifold 14 is in fluid communication with an inlet 28 and the outlet manifold 16 is in fluid communication with an outlet 30. It is understood that the fuel cell assembly 10 shown in FIGS. 1 and 2 may be a cross-section of either an anode side or a cathode side.

Figures 3, 4:
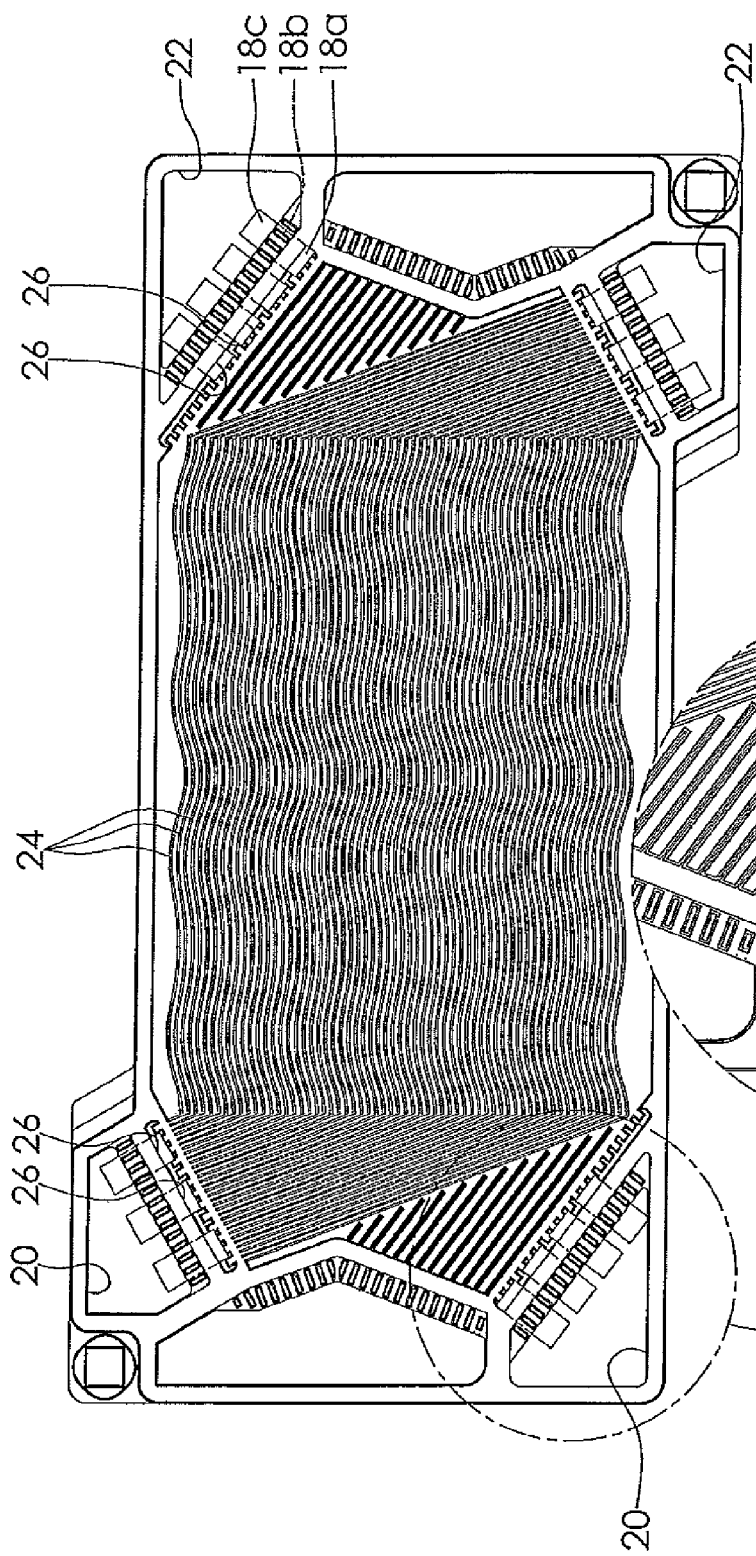
FIG. 3 is a top plan view of a fuel cell plate of the fuel cell stack illustrated in FIG. 1.
FIG. 4 is an enlarged fragmentary top plan view of the fuel cell plate illustrated in FIG. 3.

FIGS. 3 and 4 show a top plan view of a bipolar fuel cell plate 12 formed from a pair of unipolar plates. The bipolar plate 12 includes two inlet apertures 20, two outlet apertures 22, and a plurality of flow channels 24. It is understood that the flow channels 24 may include the channels disposed on an external face of the fuel cell plate 12, as well as the passages disposed intermediate internal faces of the fuel cell plate 12. It is also understood that the material of construction, size, shape, quantity, and type of plates 12 in the fuel cell assembly 10, and the configuration of the fuel cell plates 12 within the assembly 10, may vary based on design parameters such as the amount of electricity to be generated, the size of the machine to be powered by the fuel cell assembly 10, the volumetric flow rate of gases through the fuel cell assembly 10, and other similar factors, for example. The fuel cell plates 12 may be formed from any conventional material such as graphite, a carbon composite, or a stamped metal, for example. The fuel cell plate 12 shown in FIG. 3 may be used for an anode side or for a cathode side (not shown) of the fuel cell assembly 10. Further, it is understood that the plate 12 may have any number of inlet apertures 20 and outlet apertures 22, as desired. As shown, the flow channels 24 are undulated. However, the flow channels 24 may be substantially linear, serpentine, or have other configurations, as desired.

Water transport structures 18 are disposed on the fuel cell plate 12 at the inlet apertures 20 and the outlet apertures 22, as shown in FIGS. 3 and 4. It is understood that more or fewer water transport structures 18 can be used as desired. The water transport structures 18 include a first end 18a, a second end 18c, and an intermediate portion 18b formed between the first end 18a and the second end 18c.

The first ends 18a of the water transport structures 18 extend into apertures 26 formed in the fuel cell plate 12 intermediate the flow channels 24 and the inlets 20 and intermediate the flow channels 24 and the outlets 22. Typically, the apertures 26 are formed intermediate a gasket 32 and the flow channels 24, as shown in FIG. 2, although other configurations can be used if desired.

The intermediate portions 18b of the water transport structures 18 are disposed between the unipolar plates of the fuel cell plate 12. In the embodiment shown, the intermediate portions 18b of the water transport structures 18 circumvent the gasket 32. Accordingly, a flow path is provided adjacent the gasket 32, as shown in FIG. 2.

The second ends 18c of the water transport structures 18 extend from between the fuel cell plates 12 and into the inlet apertures 20 and outlet apertures 22. In the embodiment shown, the water transport structures 18 have a substantially rectangular shape. However, the water transport structures 18 may have any shape as desired such as a triangular shape, a curvilinear shape, and an irregular shape, for example. As illustrated in FIGS. 1 and 2, the second ends 18c of the water transport structures 18 depend downwardly due to gravity, thereby causing adjacent second ends 18c to substantially abut. However, it is understood that the second ends 18c can hang individually and in other configurations as desired.

The water transport structures 18 may be formed from any non-conductive porous material such as a foam, cotton, wool, glass fibers, felt, flocked fibers, paper, and paper and polymer fiber composites, for example. The water transport structure 18 may also include a hydrophilic coating such as a silicon oxide ($SiO_x$), another metal oxide, or other chemical coating, for example, a hydrophobic coating, or be formed from a hydrophilic or hydrophobic material.

The inlet manifold 14 includes the inlet 28 in fluid communication with the inlet manifold 14 formed in the fuel cell assembly 10 by the inlet apertures 20 of the fuel cell plates 12. The plates 12 are stacked with the inlet aperture 20 of each plate 12 substantially aligned with the inlet aperture 20 of an adjacent plate or fuel cell plates 12. It is understood that the diameter, quantity, and length of the inlet manifold 14 will depend on the size and quantity of inlet apertures 20 in the fuel cell plates 12 and the number of fuel cell plates 12 stacked in the fuel cell assembly 10.

The outlet manifold 16 includes the outlet 30 in fluid communication with the outlet manifold 16 formed in the fuel cell assembly 10 by the outlet apertures 22 of the fuel cell plates 12. The plates 12 are stacked with the outlet aperture 22 of each plate 12 substantially aligned with the outlet aperture 22 of an adjacent plate or plates 12. It is understood that the diameter, quantity, and length of the outlet manifold 16 will depend on the size and quantity of outlet apertures 22 in the plates 12 and the number of plates 12 stacked together in the fuel cell assembly 10.

Generally, during operation of a fuel cell power system, a hydrogen reactant is fed into the anode side of the fuel cell assembly 10. Concurrently, an oxygen reactant is fed into the cathode side of the fuel cell assembly 10. On the anode side, the hydrogen is catalytically split into protons and electrons. The oxidation half-cell reaction is represented by: $H_2 \leftrightarrow 2H^+ + 2e^-$. In a polymer electrolyte membrane fuel cell, the protons permeate through the membrane to the cathode side. The electrons travel along an external load circuit to the cathode side creating the current of electricity of the fuel cell assembly 10. On the cathode side, the oxygen reacts with the protons permeating through the membrane and the electrons from the external circuit to form water molecules. This reduction half-cell reaction is represented by: $4H^+ + 4e^- + O_2 \leftrightarrow 2H_2O$. Anode exhaust from the anode side flows through a backpressure control valve to a combustor, or is alternatively recycled back to the anode inlet manifold. Cathode exhaust from the cathode side flows through a second backpressure control valve to the combustor or to the ambient environment. A control module typically regulates the conditions of the hydrogen stream, oxygen stream, and exhaust streams by operating various control valves, backpressure control valves, and compressors in response to signals from pressure sensors and electrical power sensors connected to the fuel cell assembly 10.

During operation of the fuel cell assembly 10, droplets of liquid water are formed in the channels 24 of the fuel cell plates 12 on the cathode sides of the fuel cell assembly 10. Some water also may be transported into the anode flow channels, or may form in the anode channels via condensation resulting from consumption of the hydrogen. It is understood that the operation as described herein for the cathode side is similar to operation for the anode side of the fuel cell assembly 10. The air stream flowing through the cathode side causes the water droplets to flow through the channels 24, toward the outlet manifold 16. Water vapor also flows towards the outlet manifold 16. Once the water droplets contact the first ends 18a of the water transport structures 18, the water is wicked away from the channels 24 by the water transport structures 18, through the intermediate portions 18c, and into the manifolds 14, 16 from the second ends 18b. Because the apertures 26 are formed intermediate the gasket 32 and the flow channels 24, the water and vapor may be removed from the assembly 10 while also facilitating proper sealing by the gasket 32. If the water transport structures 18 are spaced apart as shown in FIG. 3, water and water vapor will also be transported past the water transport structures 18 through the manifolds 14, 16 and from the fuel cell assembly 10 in the known methods of water removal. If the water transport structures 18 include a hydrophilic coating, or are produced from a hydrophilic material, this will provide additional capillary force to attract the water droplets and the condensed water vapor. The exhaust gas streams also pass through the water transport structures 18, and through the outlet manifold 16. If the water transport structures 18 include a hydrophobic coating or are produced from a hydrophobic material, capillary action is aided by the repulsive nature of the coating or material.

It is expected that three different water transport mechanisms may be utilized to remove the water from the channels 24, depending on the material used for the water transport structures 18. First, the porous materials 18 may form a network of open, continuous pores that are capable of utilizing capillary forces to transport the water therethrough. Second, because the second ends 18c of the water transport structures 18 abut and form continuous paths through the inlet manifold 14 and the outlet manifold 16 of the fuel cell assembly 10, the water absorbed by the water transport structures 18 will create a static pressure head to facilitate removal of the water from the manifolds 14, 16. It is desirable, though not necessary, for a portion of the water transport structures 18 to be saturated to create a sufficient head to cause the water to drain from the water transport structures 18. If a saturated portion is not created in the water transport structures 18, a peristaltic pump (not shown) may be used with the fuel cell assembly 10 to cause the water to flow through the assembly 10 and out of the water transport structures 18. The peristaltic pump may be a peristaltic pump such as the one disclosed by Anonymous, Pump to Remove Water from a Wick, Pub. No. 494084, O. G. June 2005. Third, during operation of the fuel cell assembly 10, it is anticipated that a portion of an operational cycle will result in the outlet reactants streams being less than saturated, wherein evaporation will aid water removal from the water transport structures 18.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell plate comprising:
   a bipolar plate having a first aperture and a second aperture formed therein;
   a plurality of flow channels formed on each face of the bipolar plate; and
   a water transport structure disposed on the bipolar plate and in fluid communication with at least one of the flow channels and the first aperture and the second aperture of the bipolar plate and configured to wick away water from the at least one of the flow channels to the first aperture and the second aperture, wherein the water transport structure includes a first end extending into the second aperture, an intermediate portion disposed between the faces of the bipolar plate, and a second end formed of a porous material and extending into the first aperture.

2. The fuel cell plate of claim 1, wherein the water transport structure is formed from one of a foam, cotton, wool, glass fibers, a felt, flocked fibers, a paper, and a paper and polymer fiber composite.

3. The fuel cell plate of claim 1, wherein the water transport structure is a foam having varying pore sizes.

4. The fuel cell plate of claim 1, wherein the water transport structure includes one of a hydrophilic coating and a hydrophobic coating.

5. The fuel cell plate of claim 4, wherein the hydrophilic coating is a metal oxide.

6. The fuel cell plate of claim 1, further comprising a plurality of the water transport structures spaced apart from one another and disposed on the fuel cell plate.

7. A fuel cell assembly comprising:
   a fuel cell stack including a plurality of fuel cell plates, each of the fuel cell plates having a plurality of flow channels and a plurality of faces, wherein each of the fuel cell plates includes at least a first aperture formed therein, the at least first apertures of the fuel cell plates substantially aligned to form a manifold; and
   a water transport structure disposed on and extending into the manifold from an inner edge forming the first aperture of each of the fuel cell plates, each of the water transport structures in fluid communication with at least one of the flow channels and the first aperture of each of the fuel cell plates and configured to wick away water from the at least one of the flow channels to the first aperture, wherein water is caused to flow from the at least one flow channel of each of the fuel cell plates, through each of said water transport structures, and through the manifold.

8. The fuel cell assembly of claim 7, wherein the water transport structure includes a first end disposed through a second aperture formed in a face of each of the fuel cell plates between the flow channels and the first aperture of each of the fuel cell plates, an intermediate portion disposed between the faces of the fuel cell plates, and the second end extends from between the fuel cell plates into the first apertures.

9. The fuel cell assembly of claim 7, wherein the water transport structure is formed from one of a foam, cotton, wool, glass fibers, a felt, flocked fibers, a paper, and a paper and polymer fiber composites.

10. The fuel cell assembly of claim 7, wherein the water transport structure is a foam having varying pore sizes.

11. The fuel cell assembly of claim 7, wherein the water transport structure includes one of a hydrophilic coating and a hydrophobic coating.

12. The fuel cell assembly of claim 11, wherein the hydrophilic coating is a metal oxide.

13. The fuel cell assembly of claim 7, further comprising a plurality of the water transport structures spaced apart from one another and disposed on the fuel cell plate.

14. The fuel cell assembly of claim 7, wherein a portion of the water transport structure extending into the manifold substantially abuts the water transport structure of adjacent ones of the fuel cell plates.

* * * * *